(12) United States Patent
Bowman

(10) Patent No.: US 6,907,161 B2
(45) Date of Patent: Jun. 14, 2005

(54) FIBER OPTIC ROTARY JOINT

(75) Inventor: Anthony L. Bowman, Pembroke, VA (US)

(73) Assignee: Moog Components Group Inc., East Aurora, NY (US)

( * ) Notice: Subject to any disclaimer, the term of this patent is extended or adjusted under 35 U.S.C. 154(b) by 259 days.

(21) Appl. No.: 10/287,601

(22) Filed: Nov. 5, 2002

(65) Prior Publication Data

US 2004/0086222 A1 May 6, 2004

(51) Int. Cl.[7] .................................................. G02B 6/26
(52) U.S. Cl. ........................................... 385/26; 385/25
(58) Field of Search .................................... 385/25, 26

(56) References Cited

U.S. PATENT DOCUMENTS

| | | | |
|---|---|---|---|
| 4,525,025 A | 6/1985 | Hohmann et al. | |
| 5,991,478 A | 11/1999 | Lewis et al. | |
| 6,102,173 A | 8/2000 | Tuttlebee | |
| 6,104,849 A | 8/2000 | Lewis et al. | |
| 6,128,426 A | 10/2000 | Einhorn | |
| 6,385,367 B1 * | 5/2002 | Rogers et al. | ................ 385/26 |

* cited by examiner

*Primary Examiner*—John R. Lee
*Assistant Examiner*—Paul M. Gurzo
(74) *Attorney, Agent, or Firm*—Phillips Lytle LLP

(57) ABSTRACT

This invention eliminates the lens/prism assemblies and the multiple pick-up fibers that must be multiply lensed to a detector to get sufficient signal strength for the system to work. This invention also compensates for some of the rapid rise and fall time of the present system. A single pick-up, either a fiber or a photodiode, is placed at the end of a waveguide. A lens or lens system is used to focus a single optical signal on to the fiber face or the photodiode active area. Various light injection techniques, such as fibers, fiber/lens assemblies, lensed VCEL, lasers, or LEDs can be utilized because of the location in the system.

22 Claims, 3 Drawing Sheets

FIBER OPTIC ROTARY JOINT

FIELD OF THE INVENTION

The present invention relates generally to fiber optic rotary joints and, more particularly, to contactless fiber optic rotary joints for transmitting high bit-rate signals.

BACKGROUND OF THE INVENTION

Devices called fiber optic rotary joints are well known. Fiber optic rotary joints allow optical signals to be transferred between fibers located, respectively, on members that are rotating with respect to each other, such as where one member is rotating and the other member is stationary. Devices of this type are categorized as an on-axis rotary joint when the communicating optical fibers are located along the axis of rotation. Such devices are categorized as an off-axis rotary joint if access, by the communicating optical fibers, to the axis of rotation or centerline is not possible or practical. The technology employed in these two types of rotary joins is quite different. The present invention concerns off-axis rotary joints.

Contactless fiber optic rotary off-axis joints have been developed as disclosed in U.S. Pat. No. 4,525,025, which is also assigned to the present assignee. The '025 patent discloses a fiber optic rotary joint which couples a pulsed optical signal across a rotary interface and includes an annular reflective wall formed on a stator and an optic fiber mounted on the stator having one end in close proximity, and tangential, to the annular reflective wall. A signal emitted by one of the optic fibers will be reflected along the annular reflective wall and is then received by the other of the optic fibers.

Actual joints constructed in a manner similar to that generally disclosed in the '025 patent have been limited to a rotor diameter of about 10–12 inches and data rates of about 50 megabits/sec. due to unacceptable propagation delays causing bit pulse-width distortion. There is a need for contactless fiber optic joints having rotor diameters of up to about 40–50 inches using pulsed optical signals having data transfer rates of up to about 100–400 megabits/sec. To meet these requirements, two criteria must be met. First, optical variations that occur due to the rotation of one of the members must be minimized. Second, propagation delays must be controlled to minimize their effect on pulse-width distortion.

Optical variations resulting from rotation can be minimized by using a multiplicity of optical pick-ups spaced circumferentially about either the rotor or the stator, respectively. The problem is that it is desirable to have as few pick-ups as possible in order to minimize complexity and therefore minimize cost. This has been addressed in U.S. Pat. No. 5,991,478 issued Nov. 23, 1999 and U.S. Pat. No. 6,104,849 issued Aug. 15, 2000. These patent are also assigned to the assignee of the present invention and patent application. The entirety of these two patents are hereby incorporated by reference into the present specification.

The present off-axis fiber optic rotary joint technology uses multiple inputs and pick-ups to send and receive data across members that have large diameters. The use of multiple inputs and pick-ups is required to keep the optical signals at a level that is sufficiently high to permit the photodiode receivers to operate. Wave guides are employed. The multiple inputs and pick-ups also cause a rapid rise and fall of the signal because the signal reflects from one area of the waveguide to another.

The inputs and pick-ups consist of lens/prism assemblies or other means of transmission that require very close mechanical tolerances when installed in the system. The inputs and pick-ups must pass very close to each other to maintain the proper optical levels. The costs associated with multiple inputs and pick-ups can make production prohibitive.

OBJECTS AND BRIEF DESCRIPTION OF THE INVENTION

It is an object of this invention to provide a fiber optic rotary joint that is not subject to the above mentioned problems and limitations.

It is another object of this invention to provide an off axis, contactless, fiber optic rotary joint that can accurately transmit a high bit optical signal.

It is a further object of this invention to provide an improved fiber optic rotary joint that can be used on rotating apparatus having a circumference of at least about 4 meters.

It is a still further object of this invention to provide a fiber optic, off-axis, contactless rotary joint that uses a single optical fiber or photodiode pick up.

Other and additional objects of this invention will become apparent from a consideration of this entire specification including the drawing thereof and the claims appended thereto.

SUMMARY OF THE INVENTION

In accord with and fulfilling these objects, this invention eliminates the lens/prism assemblies and the multiple pickup fibers that were lensed to a detector in order to obtain sufficient signal strength for the system to operate effectively. Further, this invention provides compensation for some of the rapid rise and fall of the signal strength that is inherent in a plural input/plural pickup system. According to this invention, there is provided a single pickup, in the form of an optical fiber or a photodiode, that is placed at the end of the wave guide. A lens, or lens system, is provided to focus the optical signal on to the fiber face or the active area of the photodiode.

This invention comprises a combination of a rotor and a stator in rotating relationship to each other. One of these members (rotor or stator) has a plurality of transmitters spaced about its periphery and the other member (stator or rotor) has a single wave guide, of special construction associated with a lens assembly (that may include an optical fiber) and thence with an optical receiver. The wave guide is generally arcuate in shape, preferably a segment of a circle that is concentric with the circumferences of the rotor and the stator, and has a length of less than 360°. The length of the wave guide is related to the number of optical transmitters such that there are sufficient optical transmitters so that at least one optical transmitter is always in operative proximity to the entry into the wave guide. The inside surface of the wave guide is comprised of at least one flat, reflective surface that is geometrically positioned such that the optical output of the transmitter strikes the flat reflective surface and is focused substantially only on the lens assembly pick up. In a preferred embodiment, a plurality of flat reflective surfaces is provided so positioned that all of the light input into the wave guide is reflected from at least one of such surfaces and each such surface is positioned such that it focuses light impinged thereon on the lens assembly pick up. Thus, when there are multiple light beams entering the light guide, or when the entering light beam is moving, as is the case with an operating rotor and stator, the input light is substantially always impinged on at least one flat reflective surface which reflects the impinged light on the pick up lens assembly. The length of the flat, reflective surfaces, the number of flat, reflective surfaces, and the positions (angular orientations) of the flat, reflective surfaces are so chosen to accomplish these operations. The flat, reflective surfaces may be raised from the arcuate interior surface of the wave guide, or they may be depressed from that surface. It will clearly be appreciated that, if the wave guide has arcuate internal surfaces, the flat, reflective surfaces must be at least partially either above or below the level of the arcuate surfaces over at least a portion of their length. The reflective surfaces are suitably plated with highly polished gold reflector.

The wave guide structure of this invention is distinct from the wave guide structures of the prior art in that, in the prior art, entering light beams pass around the wave guide in a series of chordal steps whereas in the instant invention, light beams that enter the wave guide are only reflected once directly on to the lens assembly pick up. This enables the instant invention to have a much more accurate pick up of the transmitted light.

BRIEF DESCRIPTION OF THE DRAWINGS

The present invention is illustrated by way of example, and not by limitation, in the figures of the accompanying drawings, wherein elements having the same reference numeral designations represent like elements throughout all of the figures, and wherein.

This invention eliminates the lens/prism assemblies and the multiple pick-up fibers that must be multiply lensed to a detector to get sufficient signal strength for the system to work. This invention also compensates for some of the rapid rise and fall time of the present system. A single pick-up, either a fiber or a photodiode, is placed at the end of a waveguide. A lens or lens system is used to focus a single optical signal on to the fiber face or the photodiode active area. Various light injection techniques, such as fibers, fiber/lens assemblies, lensed VCEL, lasers, or LEDs can be utilized because of the location in the system.

The injection points can move outside the waveguide so that close mechanical tolerances are not required. The waveguide, rather than being a true circular arc segment, has raised flat areas in angularly-spaced positions around the wave guide that are preferably located at points in the arc where the optical signal would be expected to be weak. A plurality of these raised flat areas reflects the signal from reflector to reflector, and thence into the lens system at the end of the waveguide. At high data rates, problems due to phase shift are compensated for by the waveguide length. If multiple channels are required in a system, optically insulating barriers between waveguides will be necessary to eliminate cross-talk problems.

In the prior art, fiber optic rotary joints, included a stator with a waveguide, and a rotor that is rotatable through a full 360° revolution and is concentric to the stator. A light transmitter is positioned on a first circumference of either the rotor or the stator and is connected to a first light transmitter that is adapted to emit an optical signal. The light receiver is positioned on a second circumference of the other member, the stator or the rotor, and is connected to a waveguide having a short angular length. Each of the optical signals is emitted tangentially into the waveguide and is reflected from one flat reflective area to the next flat reflective surface of the waveguide and eventually is received by the light receiver.

DESCRIPTION OF THE BEST MODE OF PRACTICING THIS INVENTION

Figure 1:
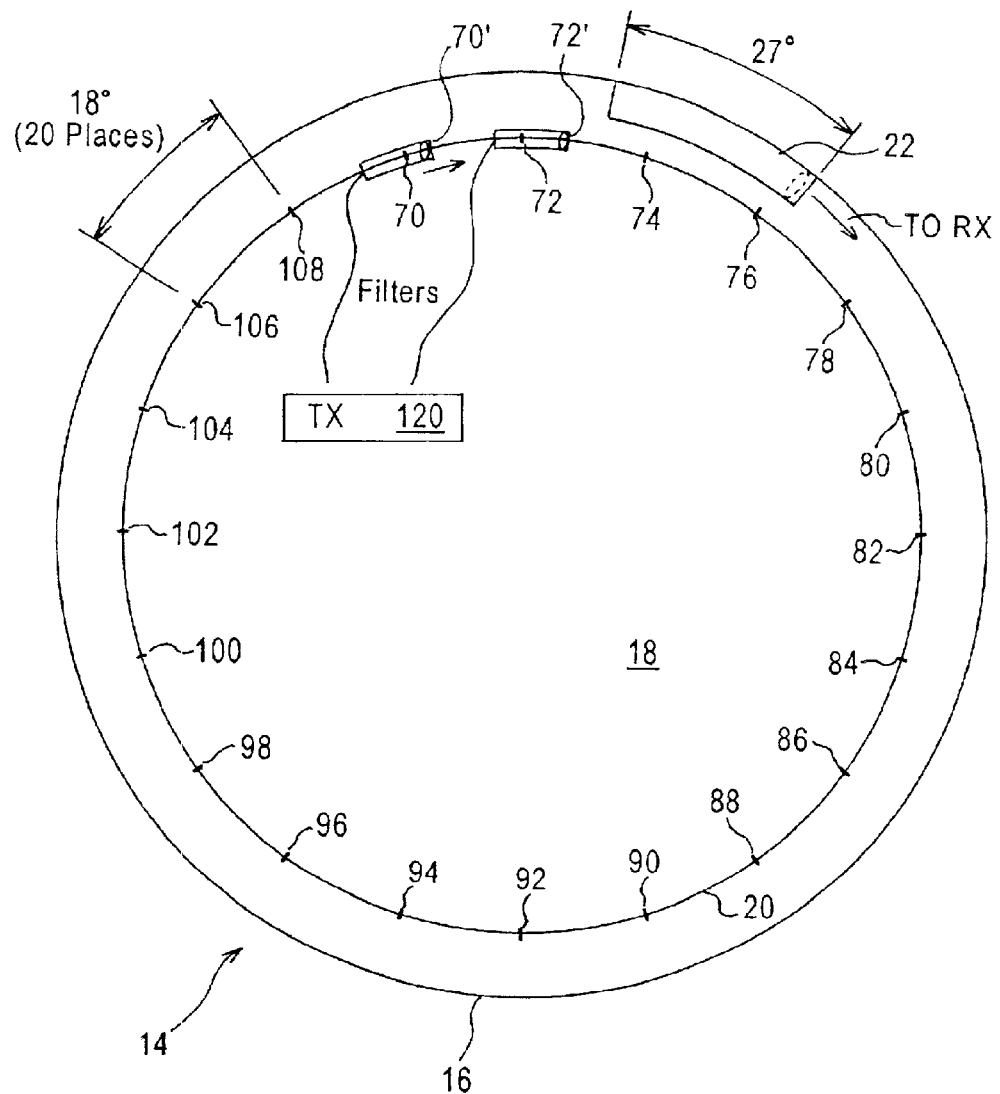
FIG. 1 is a schematic representational view of one form of a fiber optic rotary joint according to the present invention.
Figure 2:
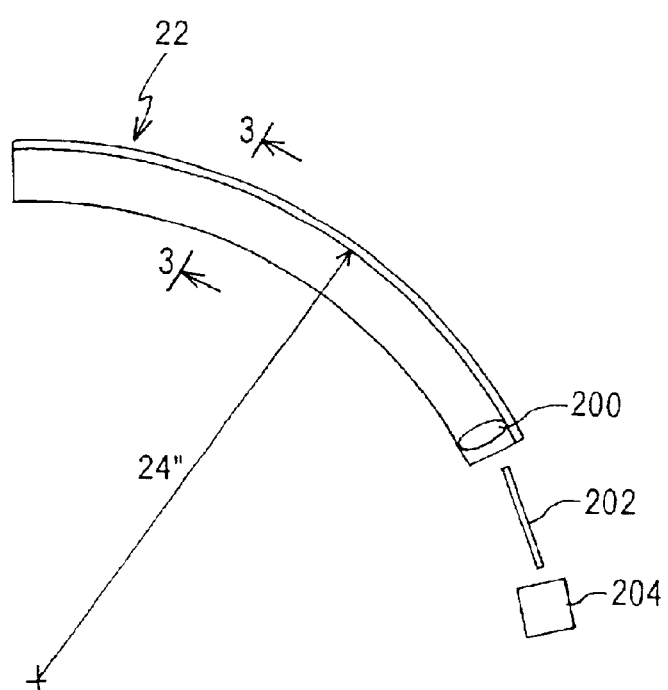
FIG. 2 is a sectioned schematic representational view of a waveguide and receiver for use in carrying out the present invention, this view being taken along lines A—A in FIG. 3 looking in the direction of the arrows.

Refer now to FIGS. 1 and 2 where a first embodiment of a fiber optic rotary joint, generally indicated at 14, constructed in accordance with the principles of the present invention, is shown. The fiber optic joint is usable in any environment requiring large diameter capable of transmitting high bit-rate signals, and is particularly useful for cat-scan machines. For convenience, the fiber optic rotary joint will be described in relation to the orientation illustrated in FIG. 1, and, consequently, terms such as "above," "upwardly," and "clockwise," and "counterclockwise," as used herein are to be construed in the relative, rather than absolute, sense. It is anticipated that those of ordinary skill in this art will appreciate that the apparatus of this invention may be oriented at any position that will suit any specific use.

Figure 4:
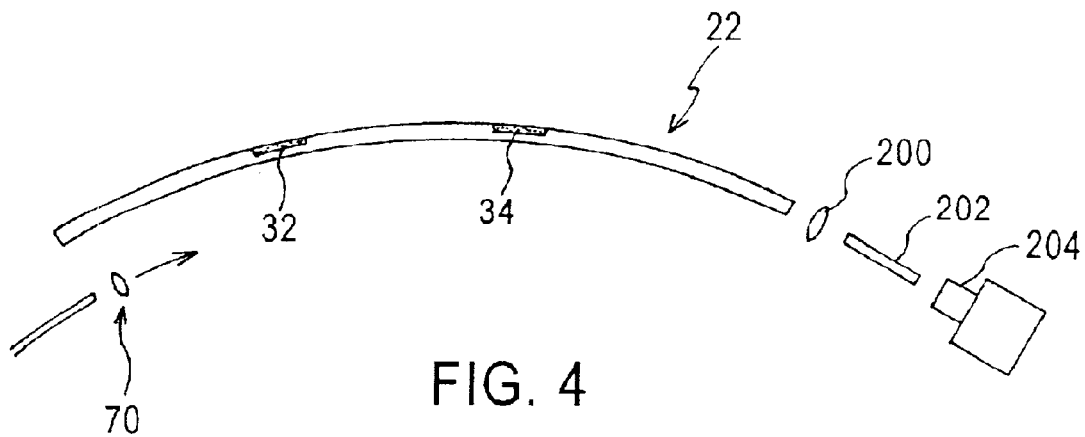
FIG. 4 is a view of the first waveguide embodiment of this invention with a lens system, an optical fiber and a photodiode.
Figure 5:
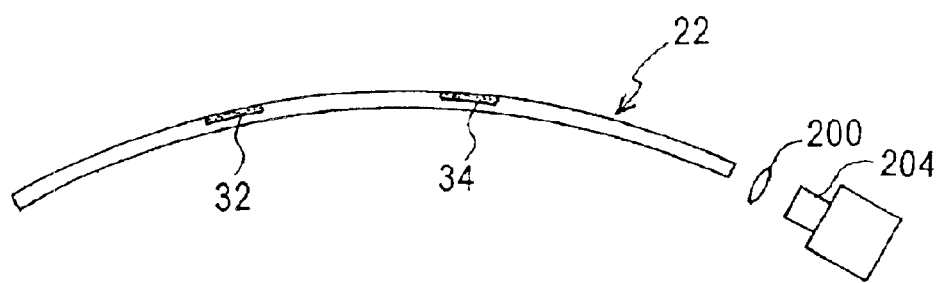
FIG. 5 is a view of a second waveguide embodiment of this invention with a lens system and a photodiode.

The depicted fiber optic rotary joint 14 includes a stator 16 and a rotor 18. Rotor 18 has a circular outer circumference 20. Stator 16 includes a waveguide 22 having an annular inner surface 24 side walls 26, 28 extend (see FIG. 3). The inner surface 24 has flat depressed or raised areas 32, 34 (see FIGS. 4 and 5). For a rotor with a radius of about 24 inches, the flat mirrored areas are preferably located approximately 6°–7° apart. Each of the flat mirrored surfaces is preferably about 1° in length. It will be appreciated by those of ordinary skill in this art that the length of the flat mirrored surfaces, their separation distance, and the number of such surfaces in a single wave guide, will vary as a function of the diameter/radius of the rotor/stator. The raised or flat mirrored areas allow the light (signal) to be controlled so as to be specifically directed toward the lens system 100 (see FIG. 4) at the end of the waveguide. If the flat mirrored areas were not in the waveguide 22, the direction of the focused light would not be easily controlled and it is distinctly possible that the light beam would miss the focal point of the lens system 200.

In the illustration of the instant system depicted in FIG. 1, twenty light transmitters, depicted as light injecting fibers 70, . . . , 108, are located at 18° spaced intervals and are fixed to the stator 18 and extend therefrom. Although fibers are presently preferred, other light bending devices can be used.

As illustrated in FIG. 1, fibers 70–108 are connected to a transmitter 120 at one end thereof, and the opposite end transmits light into the air gap between the rotor 18 and the stator 20. In the drawing, twenty fibers are depicted for illustrative purposes. However, there could alternatively be as few as sixteen, or even more than twenty. As depicted in FIG. 1, the fibers transmit light in a counter clockwise direction. It is also possible that the fibers are oriented to transmit light in a clockwise direction. The absolute direction of transmission is not material. It is only important that the fibers are all oriented in the same direction. In a preferred aspect of this invention, the output ends 70, 72 etc. of the fibers 70 . . . 108 are spaced approximately 18° apart. The 18 degree spacing is a function of the FORJ diameter, in this exemplary case, 48 inches. As the diameter increases, the spacing between the inputs becomes shorter. As the diameter decreases, the spacing between inputs is reduced.

A light source, such as a transmitter, emits an optical signal into the fibers 70–108. Twenty light transmitters, depicted as fibers, are preferably equally circumferentially positioned on outer circumference 20 of rotor 18 and extend tangentially therefrom. The light transmitters could also be unequally spaced. Each fiber 70 . . . 108 has a corresponding surface 70'–108' attached to the outer circumference 20. Hence, as depicted in FIG. 1, each light transmitter is positioned at 18° intervals from the next adjacent light transmitter. The orientation of these faces can be reversed so long as the light injecting surfaces face in an opposite direction from the light. Each optical fiber 70 . . . 108 is preferably of approximately equal length to avoid propagation delays so that signals received at any given light receiver are received nearly simultaneously.

Figure 3:
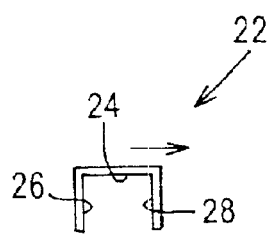
FIG. 3 is a cross-sectional view of a portion of a wave guide, this view being taken on line 3—3 FIG. 2.

The waveguide 22 has an annular surface 24 and side wall surfaces 26, 28. The waveguide is preferably in the form of a U-shaped channel as depicted in FIG. 3. The edge of the rotor 18 is positioned between surfaces 26 and 28 and is positioned radially inwardly from surface 24. Preferably the light receivers are vertically spaced from the light transmitters, but overlap radially.

In operation, the rotor 18 can rotate in either a clockwise or a counter-clockwise direction, as depicted in FIG. 1. Each signal is then launched by a respective fiber 70 . . . 108 into the air gap. Each signal emitted by one of the fibers 70 . . . 108 is emitted nearly simultaneously with the emission of the next fiber, and contains identical information. The amount of power for a given signal is determined, in part, by the desired data transmission rate. Using multiple light sources around the circumference of the rotor 18 allows the transmitted signal to be picked up by the waveguide 22. The signals that are emitted into the stator wall (not the waveguide 22) are absorbed as the wall is non-reflective.

Two optical signals emitted from the faces 70' . . . 108' of optical fibers impinge on and are reflected along the waveguide 22. The two optical signals propagate along the surface bouncing from flat surface mirror to flat surface mirror until the signals are intercepted and received by, as depicted in FIG. 2, a lens system 200, a fiber 202 and a photodiode 204 (see FIG. 4). Alternatively, fiber 202 can be omitted (see FIG. 5). Advantageously, because the transmitting fiber ends are spaced 18° apart and the waveguide is 27° in length, the waveguide 22 will always receive two signals emitted by the fibers 70–108 during rotation of the rotor 28.

Advantageously, the present invention also overcomes to a large extent propagation delays by injecting the optical signal 18° apart and having a short distance to the light receiver. The waveguide length and/or the length that the receiver is from the transmitter are restricted to a length that permits acceptable bit distortion.

An advantage of allowing the signal to be propagated in air rather than a medium, such as glass or plastic, is that the propagation speeds are faster in air. (Propagation speed for air is approximately three (3) ns/meter; propagation speed for glass having a refractive index equal to 1.41 is approximately five (5) ns/meter). Propagation speed ultimately determines the effective length of waveguide that can be used as bit-rate increases. Thus, more length of waveguide will be available for the transfer signal when the signal is propagating in air rather than a glass or fiber.

In operation, the rotor 18 can rotate in either a clockwise or counter-clockwise direction as depicted in FIG. 1. Light transmitter 120 transmits an optical signal containing identical information into fibers 70 . . . 108. Each signal is then launched by fibers 70 . . . 108 into the air gap in a clockwise direction as depicted in FIG. 1. Each signal emitted by a respective fiber 70 . . . 108 is emitted nearly simultaneously and contains identical information.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A fiber optic rotary joint, comprising:
   a stator and a concentric rotor relatively rotatable with respect to one other through a full 360° revolution;
   an arcuate waveguide disposed on one of said rotor or stator, said waveguide having an arcuate length of less than 360° and having a flat reflecting surface disposed along an arcuate wall inside said waveguide;
   a single light receiver operatively associated with said waveguide;
   wherein said reflecting surface is so configured and arranged that light entering said waveguide will be directly reflected off said reflecting surface on to said light receiver;
   a plurality of light transmitters positioned on the other of said stator or rotor, each of said light transmitters being adapted to emit an optical signal and being of such a number and of such circumferential spacing that at least one transmitter will always be operatively arranged to transmit said optical signal into said waveguide;
   means for substantially simultaneously emitting an optical signal from each of said plurality of light transmitters; and
   means to focus said reflected optical signal on said light receiver.

2. The fiber optic rotary joint of claim 1 wherein said reflective surface is at least partially raised with respect to the arcuate surface of said waveguide.

3. The fiber optic rotary joint of claim 1 wherein said light transmitter include a lens.

4. The fiber optic rotary joint of claim 1 wherein said plurality of said light transmitters are substantially equally circumferentially spaced.

5. The fiber optic rotary joint of claim 1 wherein said light receivers include a lens and a photodiode.

6. The fiber optic rotary joint of claim 1 and further comprising a plurality of optical fibers each coupled at one end thereof to a corresponding one of said light signal transmitters and at an opposite end thereof to a light source.

7. The fiber optic rotary joint of claim 6 wherein each of said plurality of optical fibers has approximately the same length.

8. The fiber optic rotary joint of claim 7 wherein said light source is laser.

9. The fiber optic rotary joint of claim 7 wherein said reflective surface occupies a chordal distance of about 60° to 70°.

10. The fiber optic rotary joint of claim 1 wherein said receiver includes a lens, a fiber, and a photodiode.

11. The fiber optic rotary joint of claim 1 and further comprising a plurality of said reflective surfaces.

12. The fiber optic rotary joint of claim 1 wherein there are twenty light transmitters.

13. The fiber optic rotary joint of claim 1 wherein said joint is an off-axis joint.

14. The fiber optic rotary joint of claim 1 wherein said reflective surface occupies a chordal distance of about 1°.

15. The fiber optic rotary joint of claim 1 wherein said light transmitters are located on one vertical plane, and said waveguide is located on a second vertical plane spaced from said first plane.

16. The fiber optic rotary joint of claim 1 wherein air separates said plurality of light transmitters from said waveguide.

17. The fiber optic rotary joint of claim 1 wherein said light transmitter is one of a fiber, fiber/lens assembly, a lensed VCEL, a laser, or an LED.

18. The fiber optic rotary joint of claim 1 wherein said light receiver is a fiber.

19. The fiber optic rotary joint of claim 1 wherein said waveguide occupies a chordal distance of about 27°.

20. The fiber optic rotary joint of claim 1 wherein light transmitters are spaced approximately 20° apart.

21. The fiber optic rotary joint of claim 1 wherein said waveguide has a U-shaped cross-section.

22. The fiber optic rotary joint of claim 1 wherein signal received by each light receiver is received at approximately the same amplitude.

* * * * *